D. G. Littlefield.

Coal-Stove.

No. 2,881. Reissued Feb. 25, 1868.

Witnesses.

J. S. Brown

R. F. Cogrood.

Inventor.

Dennis G. Littlefield

UNITED STATES PATENT OFFICE.

DENNIS G. LITTLEFIELD, OF ALBANY, NEW YORK.

IMPROVEMENT IN BASE-BURNING STOVES.

Specification forming part of Letters Patent No. 39,582, dated August 18, 1863; Reissue No. 1,594, dated December 22, 1863; Reissue No. 2,881, dated February 25, 1868.

*To all whom it may concern:*

Be it known that I, DENNIS G. LITTLEFIELD, of the city and county of Albany, and State of New York, have invented certain new and useful Improvements in a well-known kind of Stoves, which I denominate "Magazine Coal-Burners;" and I do hereby declare the following to be a full and exact description of the same, reference being had to the annexed drawings, making a part of this specification, in which—

Figure 1:
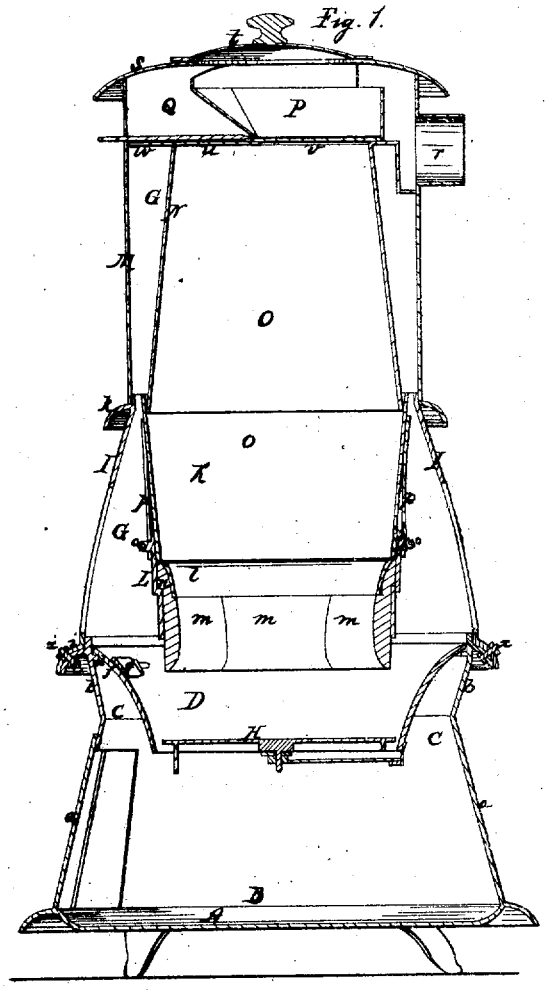
Figure 4:
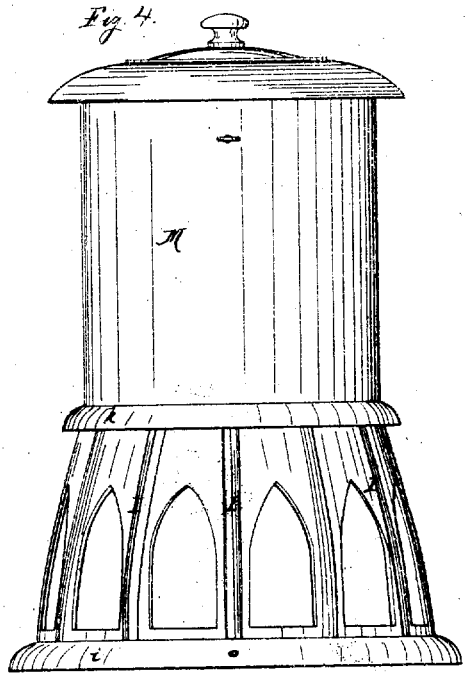
Figure 2:
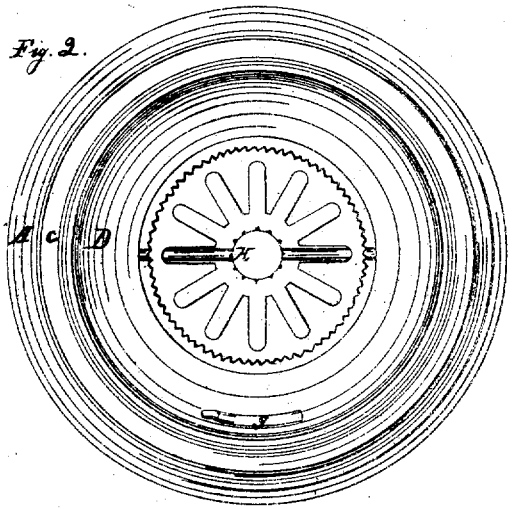
Figure 5:
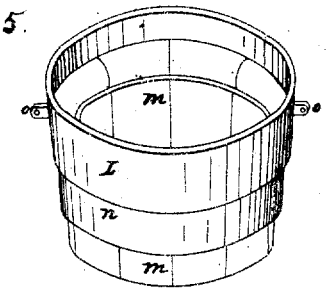

Figure 1 represents a vertical section, central from front to back, of a burner comprising my invention; Fig. 2, a horizontal section, viewed from above, of the lower part of the burner, including the place of combustion, which I denominate the "furnace;" Fig. 3, a front elevation of the lower section of the burner, including the furnace; Fig. 4, a front elevation of the upper section of the burner; Fig. 5, a perspective view of the lower part of the supplying-reservoir, which I denominate the "magazine."

Figure 3:
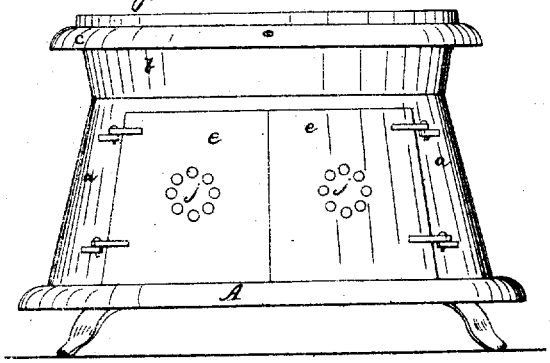

Above the base A, Figs. 1, 3, is a chamber, C C, Fig. 1, in which the furnace is suspended. This chamber terminates above in the projecting rim *c*. It is provided with doors *e e*, Fig. 3, in which are draft-registers *j j*, Fig. 3, and through which may be introduced an ash-pan.

The furnace D, Fig. 1, is of cast-iron, in the form of the lower part, inverted, of a church-bell—that is to say, flaring outward until it forms a contact around its whole periphery with the wall of the chamber C C, Fig. 1, its upper edge resting on and supported by a ledge, *d*, projecting inward from the casting *b b*, Fig. 1, or its ledge *c*.

The furnace has for its bottom my well-known mill-grate, H, Fig. 1, described in my Letters Patent bearing date December 9, 1862, and reissued May 14, 1867, or any other suitable fire-grate. There are one or more apertures through the flaring part of the furnace, which are ordinarily closed by the valve *g*, Fig. 2, but which, by opening the valve by any suitable means, may at pleasure be made to open a communication between the chamber C C, surrounding the furnace, and the chamber G G, immediately above it, and represented in Fig. 1. These two contiguous chambers, it will be observed, without this valvular opening would be completely isolated from each other; but the communication thus opened between them may be made subservient to two valuable purposes. The chamber G G being kept free by its connection with the exit-flue and chimney, the dust evolved in agitating the fire-grate, the valve being open, will naturally pass upward into this chamber, instead of coming out of the open doors of the stove into the room, as it would otherwise do. This valvular opening may also be used for the further purpose of checking combustion, instead of resorting for that purpose to the expedient of closing the draft-registers *j j*, already described, whereby the atmosphere of the room would become less pure and agreeable. On opening the valve the air entering through the open registers becomes partially diverted from its upward passage through the grate and burning fuel, while at the same time the air thus diverted will, by partially filling the chamber G G, diminish its power to draw air through the fire-grate.

The part of the burner comprising the base A, the chamber C C, and the furnace D, with their subordinate parts, and connected permanently together in the ordinary manner, may be called its "lower section," as shown in Figs. 2 and 3. The lower part of the external case above this section consists of a set of cast-iron plates, I I I, Fig. 4, permanently connected, and presenting the form represented in Figs. 1 and 4. It has at its base a rim, *i*, which fits the rim *c* of the lower section of the burner, and at the top it terminates in another rim, *k*. In the plates I I I, Fig. 4, are illuminating-spaces, which may be filled with mica.

The magazine should be so constructed, and in relation to the furnace so adjusted, as to render it in the highest degree conducive to the efficiency of the furnace, and at the same time, as far as possible, to insure its own durability.

The following description will show the construction by means of which I aim to accomplish these desirable ends.

Within the lower section of the external case, and concentric with it, is suspended the lower section of the magazine, the upper end of which is connected by suitable supports or fastenings with the case or its rim *k*, so as to leave a space between it and the case for the purpose of connecting the lower and upper part of the chamber G G, as shown in Fig. 1, and extends downward in the chamber G G such suitable distance as may be required, in the form of a truncated cone inverted. Near the lower end of the segment K it is abruptly contracted, and the part thus contracted enters the upper end of the segment L, as shown in Figs. 1 and 5, and covering the upper periphery of the lining, of soapstone or fire-brick, serves to protect it from abrasion by the descending coal. The segment L is suspended from the segment K by eyes *o o* and stirrups or hasps *p p*, or their equivalents, as shown in Fig. 1. The segment L is also abruptly contracted, (inside,) so as to form a shoulder or ledge, *n*, for the purpose of supporting the lining *m m m*, Fig. 1, having a corresponding shoulder. This device for keeping the lining in place not only serves that purpose, but is indispensable also to the preservation of the lower segment of this section of the magazine from destruction, because, the expansion of the iron by heat being greater than that of the lining, the lining would otherwise descend by its own gravity, and, besides being thus moved from its proper position, would cause the iron to crack in cooling. The downward contraction of this section of the magazine serves the important purpose of preventing the too rapid descent of the coal, and thus of preventing it from becoming too compact and from pressing too heavily at the place of most active combustion. The freedom from undue compression thus secured renders the process of combustion more complete and increases the heat evolved.

To complete the structure of the upper section of the burner the magazine is extended upward by the superaddition of its upper section, N, consisting either of cast or sheet iron, and terminating at the plate *u*, Fig. 1. Its form, it will be seen, is that of a truncated cone. The outer case is extended upward by the superaddition of the segment M to the segment I, Fig. 1, with which it is connected at the rim *k*. It is made of cast or sheet iron, and, reaching to the top of the burner, it receives the top plate, S, having the usual cover, *t*, for an aperture through which the burner is supplied with coal. The plate *u* separates the chamber G from the flue Q above, and when the aperture *v* therein for the admission of coal to the magazine is closed it covers the magazine. The slide or valve *y* for closing the opening *v*, and the passage *w* for the escape of the products of combustion, the concentric or double flue Q, and the separate chamber P, communicating directly with the exit-flue *r*, are of the same construction and arrangement and operate in the same manner as the correspondent parts described in Letters Patent granted to me bearing date December 9, 1862, and more exactly in the reissue of the same granted May 14, 1867, and therefore need no further description here.

The extensions M of the exterior case and N of the magazine, secured to the lower segments of the same parts, together with the top covers and the parts under them and above the plate *u*, constitute the entire upper segment of the upper section of the burner, as represented in Fig. 1. The two sections of the burner, Figs. 3 and 4, are connected by placing the upper upon the lower section and uniting their rims *c* and *i* by short screw-bolts *x x*, Fig. 1. This completes the burner for use. To get at the interior parts of it for the purpose of renewal or repair or to prepare the larger burners for transportation, it is only necessary to unscrew the bolts *x x*.

Those skilled in the art will, I trust, readily perceive the proper modes of carrying my invention into practice, and I will now proceed to describe the operation of the burner as thus constructed.

Preparatory to kindling the fire in the furnace the sliding cover *y*, Fig. 1, is drawn forward. Fire being then applied to the kindlings, they may be permitted to burn in this manner until the smoke has passed off. The coal is then to be put into the magazine and the sliding cover *y* pushed back, so as to close the top of the magazine. If the fire is required only for a temporary purpose, the supply of coal may be graduated according to the exigencies of the case; but if it is intended to continue the fire indefinitely without interruption the magazine may be filled with coal. If the supply of coal be small, the whole becomes ignited and will, unless checked, burn rapidly from all its surfaces, as in a common stove; but if the magazine is filled with coal the result is somewhat different. In that case, although the coal becomes ignited up to the end of the magazine, yet the combustion proceeds slowly in the upper part of the furnace, except in that part of the coal at the periphery below and outside of the magazine. The gases and other products of imperfect combustion which accumulate in the magazine pass therefrom into the space between the furnace and the lower end of the magazine and aid in maintaining a vivid combustion at that point, which, being made near to and aided by the heated draft through the furnace, assists in the combustion of the coal upon the fire-grate. The gases, having been thus utilized and spent, pass up the chamber G G and the through aperture *w* to the flue Q, and thence to the exit-pipes.

What I claim as my invention, and desire to secure by Letters Patent, is—

1. The devices described by means of which the magazine and each of the several sections of which it is composed are held in their proper positions, while at the same time the several parts are so adjusted as readily to admit of being separated and reunited at pleasure.

2. The corresponding notches or shoulders in the iron cylinder and the lining, as described, by means of which the lining is held in its place notwithstanding the greater expansion of the cylinder by heat, and without danger therefrom.

3. The magazine constructed as described, in combination with the furnace separated from it and suspended within a chamber isolated from the chamber surrounding the magazine.

4. The combination of a magazine contracting in diameter from the middle or other line downward to its lower end, with a furnace suspended within a chamber isolated from the chamber surrounding the magazine.

5. The devices described by means of which I am able to construct what I denominate the "upper" and "lower" sections of the burner, each complete in itself, separately, and so to adjust them as to admit of their being conveniently separated and reunited without injury to either.

6. The intercommunication, to be opened and closed at pleasure, between the chamber of a magazine coal-burner which surrounds the furnace and that which surrounds the magazine.

DENNIS G. LITTLEFIELD.

Witnesses:

HENRY C. LITTLEFIELD,
THEO. F. MINER.